(12) United States Patent
Wegemann

(10) Patent No.: US 9,086,311 B2
(45) Date of Patent: Jul. 21, 2015

(54) MICROWAVE-SENDING DEVICE

(75) Inventor: Uwe Wegemann, Moers (DE)

(73) Assignee: KROHNE Messtechnik GmbH, Duisburg (DE)

( * ) Notice: Subject to any disclaimer, the term of this patent is extended or adjusted under 35 U.S.C. 154(b) by 491 days.

(21) Appl. No.: 13/532,012

(22) Filed: Jun. 25, 2012

(65) Prior Publication Data
US 2013/0057366 A1 Mar. 7, 2013

(30) Foreign Application Priority Data
Sep. 1, 2011 (DE) .......................... 10 2011 112 045

(51) Int. Cl.
| | | |
|---|---|---|
| *G01S 13/08* | (2006.01) | |
| *G01F 23/284* | (2006.01) | |
| *H01Q 13/02* | (2006.01) | |
| *H01Q 19/08* | (2006.01) | |
| *H01P 3/16* | (2006.01) | |
| *H01P 3/12* | (2006.01) | |
| *H01P 3/08* | (2006.01) | |

(52) U.S. Cl.
CPC .............. *G01F 23/284* (2013.01); *H01Q 13/02* (2013.01); *H01Q 19/08* (2013.01); *H01P 3/082* (2013.01); *H01P 3/122* (2013.01); *H01P 3/16* (2013.01)

(58) Field of Classification Search
CPC ............ H01P 3/08; H01P 3/122; H01P 3/16; G01F 12/284; H01Q 13/02; H01Q 19/08
USPC ....................................... 342/124
See application file for complete search history.

(56) References Cited

U.S. PATENT DOCUMENTS

| | | | | |
|---|---|---|---|---|
| 3,593,224 A | * | 7/1971 | Eggers et al. ............... | 333/252 |
| 4,016,506 A | * | 4/1977 | Kofol .......................... | 331/96 |
| 4,381,510 A | * | 4/1983 | Wren .......................... | 343/909 |
| 5,495,218 A | * | 2/1996 | Erb et al. .................... | 333/248 |
| 5,877,663 A | * | 3/1999 | Palan et al. ................. | 333/252 |
| 5,954,526 A | * | 9/1999 | Smith .......................... | 439/136 |
| 6,155,112 A | * | 12/2000 | Eckert et al. ............... | 73/290 V |
| 6,295,018 B1 | * | 9/2001 | Diede et al. ................ | 342/124 |
| 6,553,830 B2 | * | 4/2003 | Fahrenbach et al. ........ | 73/290 V |
| 6,614,391 B1 | * | 9/2003 | Burger et al. .............. | 342/124 |
| 6,750,657 B2 | | 6/2004 | Griessbaum et al. | |
| 7,075,480 B2 | | 7/2006 | Fehrenbach et al. | |
| 7,504,721 B2 | | 3/2009 | Chen et al. | |
| 2002/0067229 A1 | * | 6/2002 | Lubbers ....................... | 333/252 |
| 2003/0151560 A1 | * | 8/2003 | Kienzle et al. ............ | 343/786 |
| 2006/0144800 A1 | * | 7/2006 | Barreras et al. ............ | 210/744 |

FOREIGN PATENT DOCUMENTS

| | | |
|---|---|---|
| DE | 10 2007 042 043 A1 | 3/2009 |
| DE | 10 2007 057 211 A1 | 5/2009 |
| EP | 0 957 371 A2 | 3/1999 |
| WO | 02/42793 A1 | 5/2002 |
| WO | 03/085365 A1 | 10/2003 |

* cited by examiner

*Primary Examiner* — Frank J McGue
(74) *Attorney, Agent, or Firm* — Roberts Mlotkowski Safran & Cole, P.C.; David S. Safran

(57) ABSTRACT

A microwave-sending device for emitting microwaves includes electronics, a wave coupler, a waveguide, and a wave-emitting section. The electronics, the wave coupler, and the waveguide are joined by a common casting.

5 Claims, 5 Drawing Sheets

MICROWAVE-SENDING DEVICE

FIELD OF THE INVENTION

The invention relates to a microwave-sending device for emitting microwaves having electronics, a wave coupler, a waveguide, and a wave-emitting section, wherein the electronics, the wave coupler, and the waveguide have a common casting.

BACKGROUND OF THE INVENTION

Microwave-sensing device are used for measuring distances in a plurality of industrial applications. Often, it is necessary, for example, to measure the fill level of a medium, such as a liquid or a bulk material in a container. For this purpose, fill level measuring devices are used that often contain a microwave-sending device of the aforementioned kind, wherein the fill level is derived from the measured distance between the microwave-sending device arranged in the space above the medium and the surface of the medium.

In the microwave-sending device, electronics generate microwaves, a wave coupler couples the generated microwaves in the waveguide, and a waveguide guides the coupled microwaves to the wave-emitting section, in which the guided waves are converted to free waves. The free waves are emitted substantially directed toward the medium and reflected back from the surface of the medium toward the fill level measuring device. The microwave-sending device usually also serves as a microwave receiver that calculates the distance to the medium according to a known radar method. Often, the microwave-sending device also derives the fill level from the calculated distance. Of course, microwave-sending devices can be used not only in fill level measuring devices, but also in any measuring device that determines the distance between the microwave-sending device and a surface using one of the known radar methods. Nevertheless, a fill level measuring device or a microwave-sending device for such a fill level measuring device will be discussed here.

A microwave sender for a fill level measuring device that makes a radar-based determination of the fill level of a medium in a container having electronics, an antenna and a housing is known from International Patent Application Publication WO 03/085365 A1 and corresponding U.S. Pat. No. 7,075,480. The electronics and the antenna are located in a hollow of a housing and the hollow is sealed, at least in respect to the atmosphere of the container in which the housing is found. Due to this structure, the electronics and the antenna are protected against aggressive conditions and against chemical and mechanical effects.

German Patent Application DE 10 2011 010 801 is directed to a microwave-sending device for emitting microwaves for a fill level measuring device with electronics, a wave coupler, a waveguide and a housing. The electronics, the wave coupler, and the waveguide are arranged inside the housing. Hollows in the housing and the structures guiding the microwaves are completely filled with a dielectric casting, so that the propagation of the microwaves takes place in the casting. Due to the propagation of the microwaves in the casting, as opposed to free space, the minimum size of the structures guiding the microwaves, such as the waveguide, is reduced. The electronics, the wave coupler, and the waveguide are affixed to the housing appropriate fixtures. Due to the casting of the electronics and the waveguide, mechanical robustness against shocks and vibrations that occur in mechanically harsh environments is increased.

Microwave-sending devices known from the prior art have a housing and fixtures for components such as electronics, a wave coupler, and a waveguide, wherein the fixtures affix and align the components to the housing as well as to each other. Additionally, a closure for the housing with a seal and a fixture for affixing to the housing are necessary so that the components can be protected against environmental effects, (e.g., according to DIN EN 60529 IP68) by the closed housing after being inserted and affixed in the housing. The fixtures for the components, and the closure having the seal and the fixture, increase the constructional complexity as well as the production and assembly effort, which then increase costs.

SUMMARY OF THE INVENTION

An object of the present invention is to provide a microwave-sending device with reduced complexity in its construction, production, and assembly, as well as decreased costs, while still maintaining high mechanical robustness and stability.

The microwave-sending device according to invention, in which the above described and shown object is met, is initially and substantially characterized in that at least the electronics, the wave coupler, and the waveguide have a casting. Surprisingly, the casting affixes the electronics, the wave coupler, and the waveguide to one another in a mechanically robust manner and with high stability. Different materials can be used as the casting, wherein it should be taken into consideration that the casting material has a sufficient flowability during processing, so that the components can be sufficiently surrounded for affixing. After hardening of the casting material, it needs to have suitable mechanical, electrical, thermal, and chemical characteristics. In this manner, the casting material has to mechanically affix the components, but may not cause excessive surface leakage, nor, during temperature changes, excessively large mechanical stress between the components and in particular between the electronic components. Furthermore, the casting material needs to be chemically stable against environmental effects and age-resistant. When the microwave-sending device is used in fill level measuring devices, the environmental effects are significantly determined by the medium in the container, whose fill level is to be measured.

The use of the microwave-sending device according to the invention having a casting that advantageously reduces effort in mechanical construction due to the omission of devices for affixing the components and, further, advantageously omits closures having fixtures and seals, through which the effort for production and assembly is reduced and costs are lowered.

In a particularly preferred design, the casting, together with the wave-emitting section completely encloses the components electronics, wave coupler, and waveguide, so that only the casting and the wave-emitting section of the waveguide come into immediate contact with the surroundings. The wave-emitting section, here, is any surface of the waveguide from which the guided microwaves are transferred into free waves.

In an alternative preferred design, the casting also completely encloses the wave-emitting section in addition to the electronics, the wave coupler, and the waveguide. In this design, the waveguide no longer comes into immediate contact with the surroundings, so that in particular the chemical resistance of the waveguide against environmental effects is circumstantial.

In a further preferred design, the guiding of the microwaves in the waveguide is implemented either using an encasement of the waveguide with an electrically conductive material or using a dielectric interface between the casting and the waveguide formed using materials having different relative permittivities and relative permeabilities for the waveguide and the casting. Guiding the microwaves at the interface has the advantage of omitting of the electrically conductive encasement, through which production effort and production costs are reduced. Guiding waves can also be implemented using a combination of both methods, so that the waveguide is only partially encased with the electrically conductive material.

In a further preferred design, fixtures for attaching the microwave-sending device are designed in the casting. The common cable for electrical supply of and communication with the electronics is connected by means of a connecting device for producing a detachable mechanical and electric connection with the microwave-measuring device, wherein a part of the connecting device is permanently fixed with the cable and another part is permanently fixed with the microwave-sending device by the casting.

In a further, particularly preferred design, the casting serves as protection against environmental effects, in particular conforming to the standard DIN EN 60529 IP68. Additionally, the casting is an encasement that provides ignition protection, and conforms in particular to the standard EN 60079-18.

In detail, there are numerous possibilities for designing and further developing the microwave-sending device according to the invention, as described herein with reference to the preferred embodiments and in conjunction with the drawings.

DETAILED DESCRIPTION OF THE INVENTION

Microwave-sending devices $1a$-$1g$ according to the invention are shown in FIGS. 1 to 5, which have electronics 2, a wave coupler (not shown), a waveguide 3 and a wave-emitting section 4. A casting 5 mechanically affixes the electronics 2, the waveguide 3, and the wave coupler arranged on a carrier of the electronics in a robust manner. The electronics 2, the wave coupler, and the waveguide 3 are completely surrounded by the casting 5 except for the wave emitting section 4.

Figure 1:
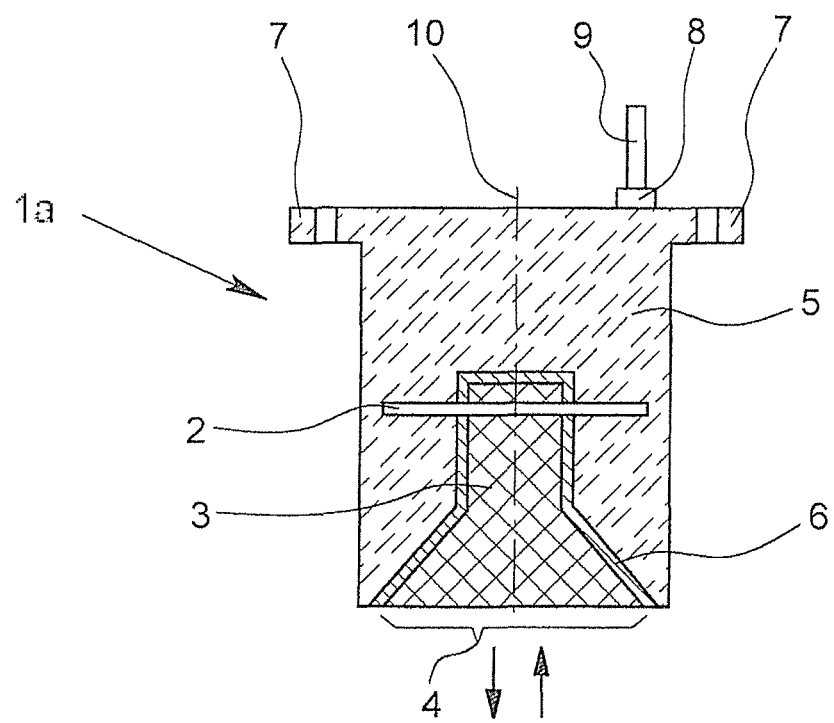
FIG. 1 shows a first embodiment of a microwave-sending device according to the invention, wherein the guiding of microwaves is implemented in a horn-shaped waveguide using an electrically conductive encasement.
Figure 2A:
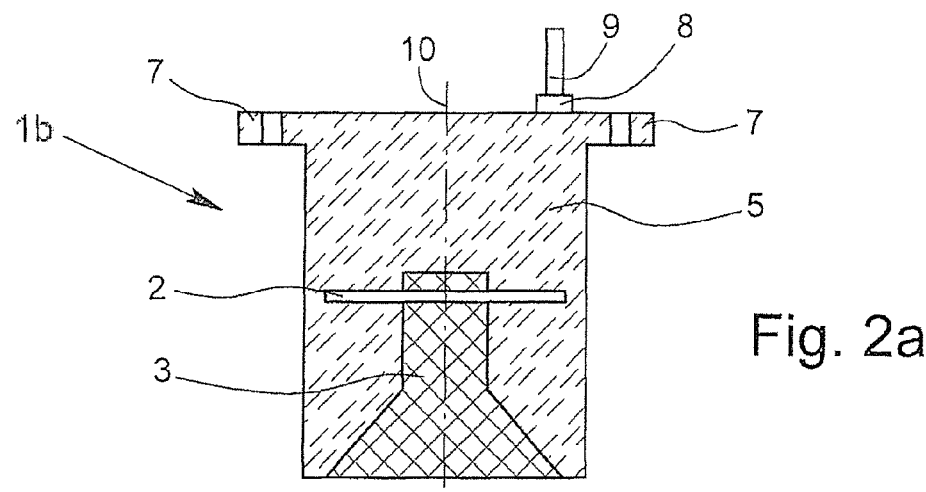
FIG. 2a shows a second embodiment of a microwave-sending device according to the invention, wherein the guiding of microwaves is implemented using an interface layer.
Figure 2B:
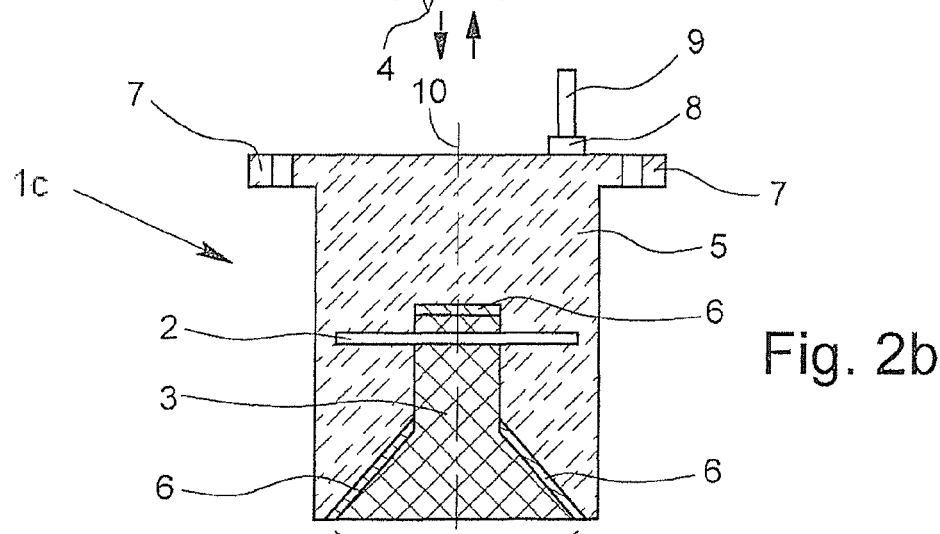
FIG. 2b shows a further embodiment of a microwave-sending device according to the invention, in which the guiding of microwaves is implemented using the interface layer as well as the partial encasement with an electrically conductive material.
Figure 2C:
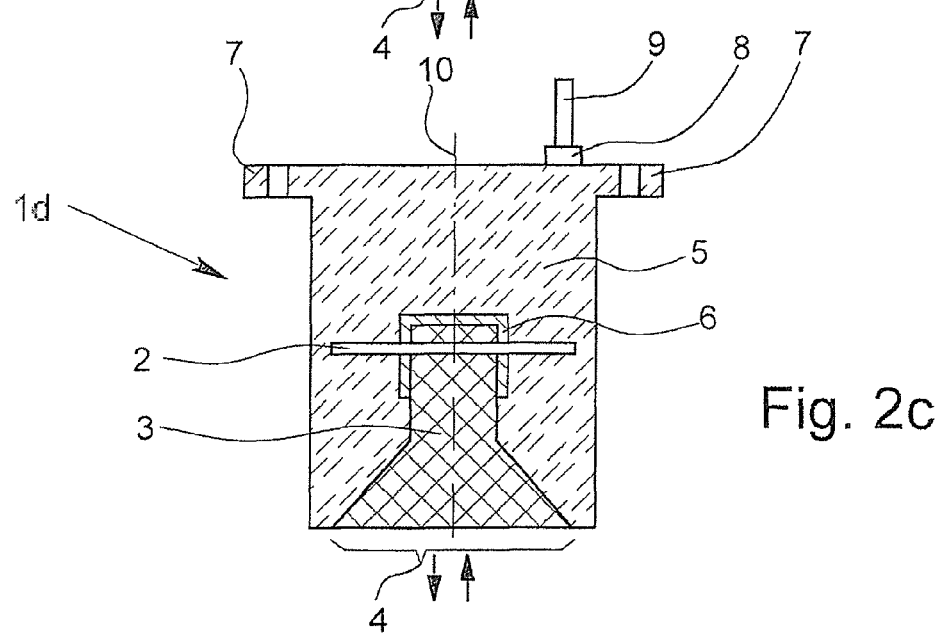
FIG. 2c shows a further embodiment of a microwave-sending device according to the invention, in which the guiding of microwaves is implemented as in the embodiment shown in FIG. 2b.

The waveguide 3 guides the waves using an encasement 6 having an electrically conductive material (e.g., FIG. 1) and/or using the interface layer between the waveguide 3 and the casting 5 (e.g., FIG. 2a; combination FIG. 2b, 2c).

There are mounting fixtures 7 in the casting 5 in the form of a screw hole for attaching the microwave emitting device $1a$, for example in a container having a medium whose fill level is to be measured. Furthermore, electrical connections of the electronics 2 occur with a cable 9 for which a cable feedthrough 8 having strain relief (not shown) is formed in the casting for taking in mechanical stress on the cable 9 from outside of the microwave-sending device.

The shown embodiments of microwave-sending devices $1a$ to $1g$ according to the invention are protected against contact, permeation of dust and water by the casting 5 according to the standard DIN EN 60529 IP68, the casting 5 further acts as an encasement that provides ignition protection according to the standard EN 60079-18 and the microwave-sending devices 1 are additionally designed intrinsically safe according to the standard 60079-15 (relating, e.g., to explosive atmospheres). The waveguide 3 and the wave-emitting section 4 of the shown microwave-sending device $1a$ have rotational symmetry in respect to a longitudinal axis 10. In contrast, the cross section surface as well as the longitudinal cut surface of the casting 5 is essentially rectangular, so that the outer shape of the casting 5 is essentially a cuboid. Of course, other outer shapes of the casting 5 are also possible, for example having an essentially circular cross section surface. Other embodiments, not shown here, also have waveguides with rectangular cross sections. These are simple to produce due to the implementation of the casting. Since the sending surface is also rectangular, the bundling of the radar beams can be influenced by the geometry of the sending surface. Interfering reflections can be faded out by the choice of the installation position.

The microwaves generated by the electronics 2 of the microwave-sending device $1a$ in accordance with the invention are coupled into the waveguide 3 by the wave coupler (not shown), which consists of at least one dielectric casting material and surrounds the wave coupler in a form-fit manner. The waveguide 3 guides the microwaves spreading inside of it essentially along a longitudinal axis 10 in the direction of the wave-emitting section 4, in that the guided microwaves are transferred to free space waves, wherein the free space waves also spread along the longitudinal axis 10. The microwaves reflected back in the direction of the microwave-sending device $1a$ from the surface of a medium, whose distance from the microwave-sending device 1 is to be measured, finally reach the electronics 2 via the wave-emitting section 4, the waveguide 3, and the wave coupler. Using the received, reflected microwaves, the electronics 2 calculate the distance between the microwave sending device $1a$ and the surface of the medium using a known radar method.

The embodiment shown in FIG. 1 of a microwave-sending device $1a$ according to the invention has a waveguide 3 that has a constant diameter perpendicular to the longitudinal axis in the area of the wave coupler arranged on the carrier of the electronics 2, which then increases in the direction of the wave-emitting section 4, so that the waveguide 3 has the shape of a horn. The wave-emitting section 4 is a flat circular area perpendicular to the longitudinal axis 10, wherein the area is essentially flush with the casting 5, so that the microwave sending device $1a$ is compact and mechanically robust. Guiding of the microwaves in the waveguide 3 is carried out by the encasement 6 of the waveguide with an electrically conductive material. Due to the propagation of the microwaves in the dielectric material of the waveguide 3, which is the same material as the casting 5, the structures guiding the waves are dimensioned smaller than in the case of propagation of the microwaves in gas, since the permittivity of the material of the waveguide 3 is higher than that of gas. Due to the smaller sized structures guiding the waves, the microwave sending device 1a is more compact overall.

The embodiment shown in FIG. 2a of a microwave sending device 1b differs from the embodiment shown in FIG. 1 in that the guiding of the microwaves is not carried out by the electrically conductive encasement 6 of the waveguide 3 but, rather, by an interface layer between the waveguide 3 and the casting 5. The interface layer is formed because the waveguide 3 and the casting 5 consist of two materials with differing relative permittivities and relative permeabilities.

In the embodiments shown in FIGS. 2b and 2c, guiding of microwaves is carried out as in the embodiment shown in FIG. 2a of a microwave sending device 1b by the interface layer between the waveguide 3 and the casting 5, as well as by the partial encasement 6 of the waveguide 3 with an electrically conductive material. By combining both types of waveguides, guiding of the waves is optimized in the waveguide 3.

Figure 3:
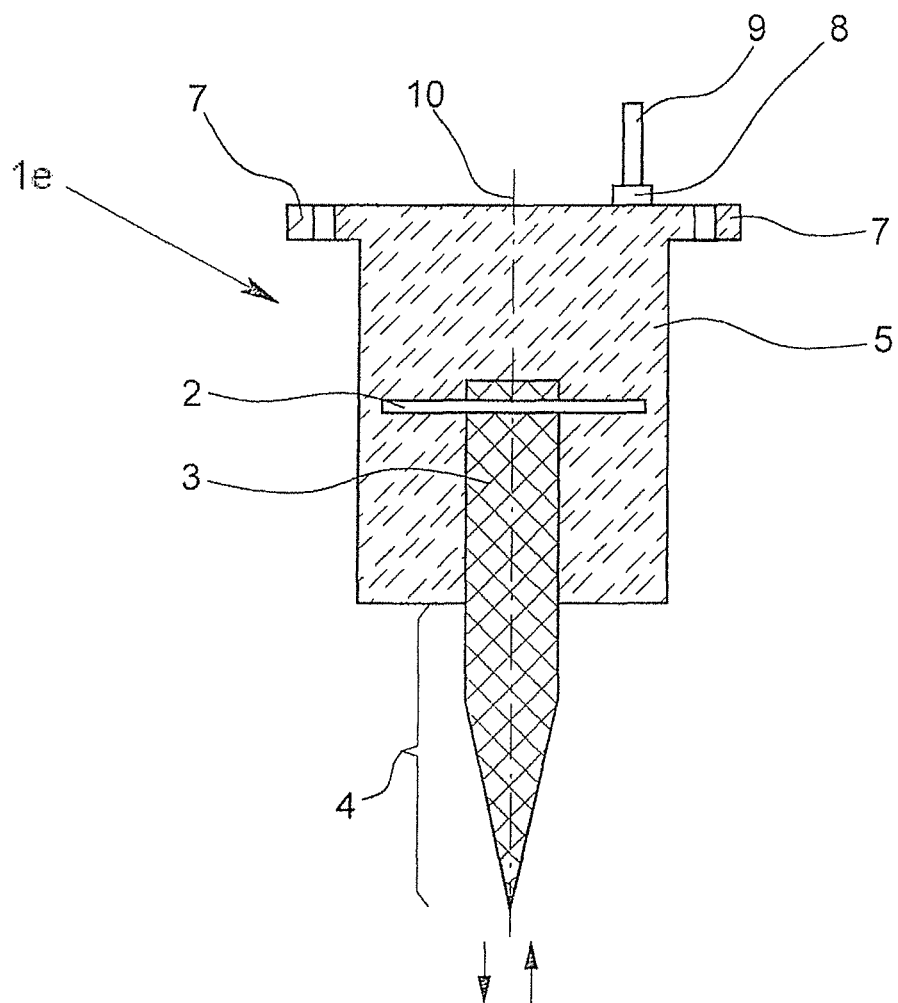
FIG. 3 shows a fifth embodiment of a microwave-sending device according to the invention with a rod-shaped waveguide.

The embodiment in FIG. 3 differs from the one shown in FIG. 2a in that the waveguide 3 is not shaped like a horn, but like a rod. If the waveguides 3 of both embodiments in the area of the wave coupler arranged on the electronics 2 are formed in the same manner, the diameter of the embodiment shown in FIG. 3 is constant in the entire section in which the waveguide 3 is encased by the casting 5, and further also at a certain stretch along the longitudinal axis 10, to finally taper conically and to end in a point on the longitudinal axis 10. The part of the waveguide 3 that extends outside of the casting 5 is the wave-emitting section 4, which, as opposed to the embodiment shown in FIG. 2a, is a three-dimensional structure and not a two-dimensional surface, wherein the propagation characteristics in free space are adapted to given requirements. Of course, further shapes of the waveguide 3 and the three-dimensional structure of the wave-emitting section 4 are possible.

Figure 4:
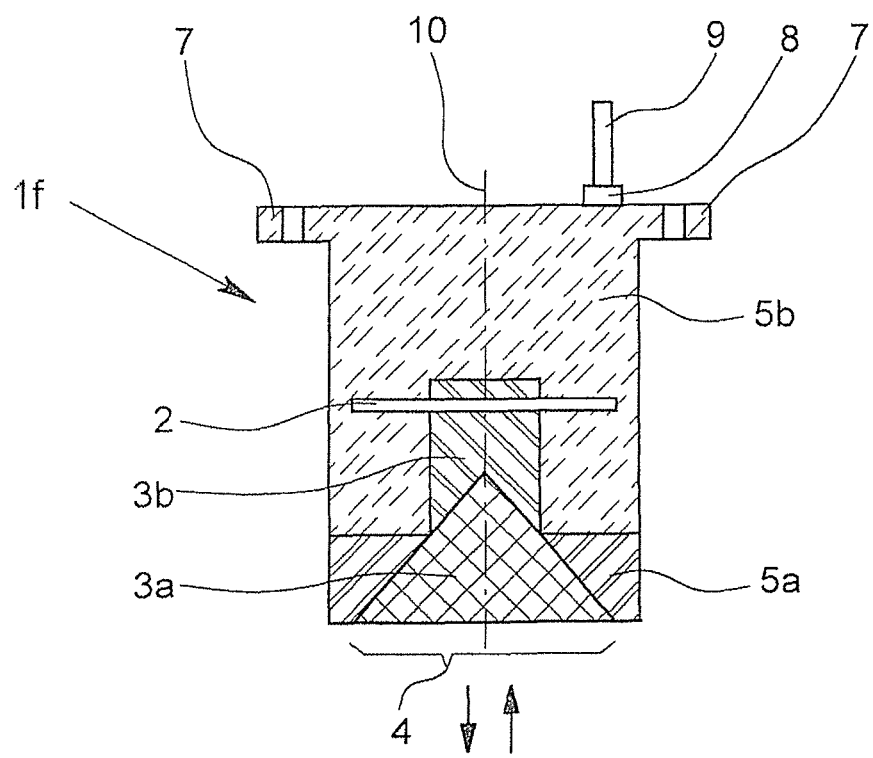
FIG. 4 shows a sixth embodiment of a microwave-sending device according to the invention with a multiple-part casting and multiple-part waveguide.

The embodiment shown in FIG. 4 differs from the embodiment shown in FIG. 2a in the materials that form the interface layer for guiding the microwaves. In the embodiment shown in FIG. 2a, the interface layer is formed between one material of the waveguide 3 and another material of the casting 5, whereas in the embodiment shown in FIG. 4, the waveguide 3 and the casting 5 consist, in each case, of two different casting materials, wherein the relative permittivities and the relative permeabilities of all four materials are different. The front part 3a of the waveguide 3 of the first dielectric material contains the wave-emitting section 4 and has the shape of a cone, which tapers along the longitudinal axis 10 in the direction opposite the direction of propagation of the microwaves and ends in a point on the longitudinal axis 10. The back part 3b of the waveguide 3, which is cylindrical and is of the second dielectric material and is arranged concentrically around the longitudinal axis 10, encloses the wave coupler form fit and a negative cone shape is formed in the front face in the direction of propagation over the entire cylinder diameter, which accommodates, form-fit, the complementing part of the cone of the front part 3a of the waveguide 3. The casting 5 in the front section 5a located between the level that coincides in the direction of propagation with the surface of the emitting section 4 and the level that coincides with the front face of the back part of the waveguide 3 consists of one third dielectric material and, in the back section 5b of one fourth dielectric material, wherein the outer cuboid shape of the casting 5 remains. The use of four materials with different relative permittivities and relative permeabilities improves the wave guiding characteristics of the interface layer.

Figure 5:
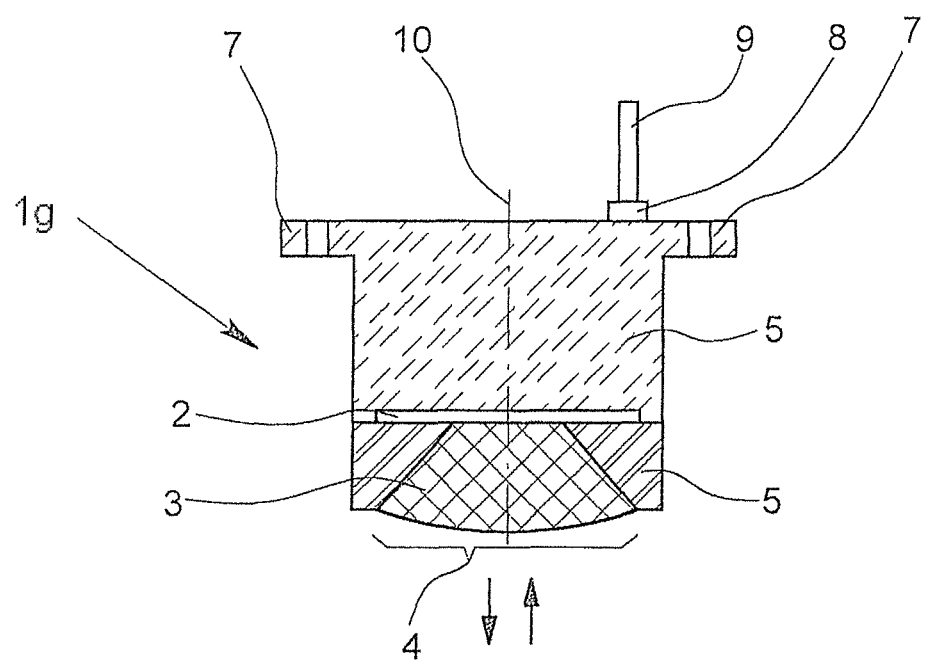
FIG. 5 shows a final embodiment of a microwave-sending device according to the invention having a planar wave coupler.

A final embodiment is shown in FIG. 5 that differs from the embodiment shown in FIG. 4 in several features. The cylindrical section of the waveguide 3 is omitted and the cone-shaped section of the waveguide 3 becomes a truncated cone, whose wave-emitting section 4 is curved outward to adapt to the propagation characteristics of the free waves. The truncated cone is the only remaining element shown in FIG. 5, in which the microwaves are propagated. The wave coupler is a planar structure arranged on the carrier of the electronics 2 having only small expansion along the longitudinal axis 10. The planar wave coupler and the omission of the cylindrical part of the wave guide 3 reduce the expansion of the microwave-sending device 1 along the longitudinal axis compared to the other embodiments.

What is claimed is:

1. A microwave-sending device for emitting microwaves, comprising:
    electronics for generating microwaves;
    a wave coupler;
    a waveguide; and
    a wave-emitting section,
    wherein said wave coupler couples the microwaves generated by said electronics to said waveguide,
    wherein at least the electronics, the wave coupler, and the waveguide are affixed to one another by being embedded within a common cast part,
    wherein said cast part and said waveguide are formed of materials having different relative permittivities and relative permeabilities,
    wherein said cast part and said waveguide adjoin each other so as to form a boundary layer at a junction thereof due to said different relative permittivities and relative permeabilities,
    wherein said boundary layer being able to guide said microwaves between said cast part and said waveguide, and
    wherein the cast part completely encloses the electronics, the wave coupler, and the waveguide except for a wave emitting section which is exposed.

2. The microwave-sending device of claim 1, wherein a mounting fixture for the microwave-sending device is formed as part of the cast part.

3. The microwave-sending device of claim 1, wherein a fixture for accommodating the mechanical load acting via the electrical connection of the microwave-sending device is included in the cast part.

4. The microwave-sending device of claim 1, wherein the cast part is a protection against environmental effects.

5. The microwave-sending device of claim 1, wherein the cast part is an encasement that provides ignition protection.

* * * * *